United States Patent [19]

Kankura et al.

[11] 4,188,826
[45] Feb. 19, 1980

[54] DEVICE FOR MEASURING THE LIQUID LEVEL OF AN ELECTRICALLY CONDUCTIVE LIQUID

[75] Inventors: Ralf Kankura, Aachen; Jürgen Keck, Jülich, both of Fed. Rep. of Germany

[73] Assignee: Kernforschungsanlage Jülich Gesellschaft mit beschränkter Haftung, Julich, Fed. Rep. of Germany

[21] Appl. No.: 907,397

[22] Filed: May 18, 1978

[30] Foreign Application Priority Data

May 27, 1977 [DE] Fed. Rep. of Germany ....... 2723999
Oct. 22, 1977 [DE] Fed. Rep. of Germany ....... 2747479

[51] Int. Cl.$^2$ .............................................. G01F 23/24
[52] U.S. Cl. .................................................. 73/304 R
[58] Field of Search ........................... 73/304 R, 304 C

[56] References Cited

U.S. PATENT DOCUMENTS

| 2,679,642 | 5/1954 | Wexler ........................ 73/304 R X |
| 2,894,390 | 7/1959 | Talbot ......................... 73/304 R X |
| 3,119,266 | 1/1964 | Atkinson ..................... 73/304 R |
| 3,812,422 | 5/1974 | DeCarolis .................... 73/304 R X |

FOREIGN PATENT DOCUMENTS 842554  6/1952  Fed. Rep. of Germany ........ 73/304 R

Primary Examiner—Gerald Goldberg
Assistant Examiner—Joseph W. Roskos
Attorney, Agent, or Firm—Karl F. Ross

[57] ABSTRACT

The height of a body of electrically conductive liquid is measured by immersing in the liquid an electrode forming an electrical resistance. The electrode is connected with two conductors electrically insulated from the liquid and tied, in turn, to an alternating-current source which is not connected to ground. The resulting network of electrode, conductors and alternating-current source forms an electrical circuit to which responds a device for measuring the potential difference which is a function of the liquid level between the potential of the liquid in a region outside the electrode-encircling stray current and a potential outside the electrode.

15 Claims, 11 Drawing Figures

DEVICE FOR MEASURING THE LIQUID LEVEL OF AN ELECTRICALLY CONDUCTIVE LIQUID

FIELD OF THE INVENTION

The present invention relates to a device for measuring the height of the body of an electrically conductive liquid using an electrode forming an electrical resistance and in contact with the liquid. More particularly, the invention relates to improvements in measuring the level of a body of electrically conductive liquid.

BACKGROUND OF THE INVENTION

Measuring devices for the indirect or remote indication of the height of a body of liquid may be required when high pressure or other conditions preclude access to the liquid or the measuring location. Naturally, it is desirable to measure the height of a body of liquid directly, e.g. to read the level on the scale of a tank or the like. Frequently, however, especially in the case of high-pressure vessels in nuclear-reactor establishments, the pressure conditions under which the system is operated and/or some other parameters preclude accessibility and hence make necessary a remote indication of the height of a body of liquid in the receptacle.

Apart from mechanical, acoustical, optical and pneumatic processes for ascertaining the height of a body of liquid in an inaccessible vessel, it is known to provide an electrical measuring process in which the change of electrical capacity, ohmic resistance or the ratios between two resistances, may be determined.

For example, in German patent DT-PS No. 842 554, there is disclosed a measuring device or system which comprises three electrodes which are immersed in the liquid and two of which are connected in series. These electrodes provide a measured value in terms of the ratio of the contact or transfer resistance between the electrodes connected in series. In this conventional measuring device, the measured value has, with respect to the measured height of the liquid level, a sharp nonlinearity or deviation from a linear relationship between the measured value and the parameter which is to be determined.

It has been proposed, by modification of the geometric form of the electrode surfaces, to achieve a linearization of such measurements. However, such techniques are not satisfactory or even usable in all cases.

The German patent DT-PS No. 2 215 950 describes a process which has the goal of overcoming the nonlinearity of the system described in German patent DT-PS No. 842 554. This attempt to overcome the nonlinearity of the earlier system is, however, only successful when the measurement gives an absolute value which is independent of the supply voltage. The nonlinearity in the output signal or value even in these cases is, however, not fully eliminated.

German patent DT-PS No. 1 798 084 describes a device which enables the stray potential which develops on a longitudinally extending electrode immersed in the liquid and which is spaced by a relatively small distance from a resistance electrode traversed by a direct current. In this arrangement, however, it is disadvantageous that the stray current associated with the resistance electrode may only partly traverse the immersion electrode which serves as a potential sensor. The measurement and the height of the body of liquid can thus be in a nonlinear relationship.

In addition, with conventional devices, the system generally has a curved characteristic which results from a perturbation of the current flow lines at the surface of the liquid and from the leakage effects at the container bottom. The results thus have an unavoidable dependency on the ratio of the spacing to the length of the two electrodes. This system also operates with an applied direct current which gives rise to boundary conditions at the electrode/liquid interface with render the results unstable with time.

Still another device for measuring the height of liquid in a vessel is described in German published application (Auslegeschrift) DT-AS No. 1 908 921. In this system, two coaxially disposed electrodes are provided, one being composed of a low-ohmic metal and the other of a high-ohmic metal. The basic concept in this system is to make the resistance of one electrode so high that the liquid acts as a short circuit across it. In this prior-art system the disadvantage is observed that the precision is limited at best. It appears that the precision of the measurement is reduced whenever such devices are used because of an unavoidable wetting of portions of the high-ohmic electrode above the liquid level.

OBJECTS OF THE INVENTION

It is the principal object of the present invention to provide a device for measuring the static height of an electrically conductive liquid whereby the disadvantages of earlier systems are avoided.

Another object of this invention is to provide a system for measuring the level of a body of electrically conductive liquid with a high degree of precision, reproducibility and linearity.

Still another object of the invention is to provide an improved method of and device for measuring the height of a body of liquid safely and reliably at locations which are generally inaccessible, e.g. in nuclear installations.

It is also an object of the invention to provide an improved device for measuring the static height of an electrically conductive liquid of the aforedescribed type which has a simple construction and is highly linear, i.e. provides a substantially linear relationship between the immersion depth of the sensor, the static height of the liquid and the measured value indicated by the device, without requiring complicated electrode configurations.

SUMMARY OF THE INVENTION

These objects and others which will become apparent hereinafter are attained, in accordance with the present invention, in a system in which the electrode is connected to two electrically insulated conductors which are not in electrical connection with the electrically conductive liquid and which are connected across an alternating-current source which is not connected to ground.

As a result, the electrode, the conductors and the alternating-current source form an electric current circuit from which a measurement can be tapped as will be described in greater detail below. The potential difference which serves as a measurement of the static height of the body of liquid is the potential difference between the potential of the liquid in a region outside the stray or vagabond current surrounding the electrode and the potential at a location in the aforementioned circuit outside the electrode. The resistance of the electrode and the alternating-current frequency are so selected that, on the one hand, the resistance of the electrode and, on the other hand, the capacitive reactance of the electrode are negligibly small and can be disregarded. The capacitive reactance is a result of the gas or oxide boundary layer which may form an insulating zone at the surface of the electrode designed to contact the liquid. The resistance of the electrode and capacitive reactance must be negligibly small with respect to the contact resistance between the electrode and the liquid.

The invention is based upon our discovery that the potential in the middle of the immersed part of the electrode corresponds to the potential of the liquid outside the region of the stray or vagabond current surrounding the immersed part of the electrode since, with elongated, thin and axially symmetrical electrodes, this stray or vagabond current runs exactly symmetrically with respect to the center of the immersed part of the electrode.

The potential difference between the potential of the liquid (and thus the potential at the center of the immersed part of the electrode) and the potential of a point in the current circuit externally of the electrode is found to have a linear dependency upon the depth of immersion of the electrode.

The point in the circuit serving as the reference point, i.e. the point whose potential is measured against the potential of the liquid, can be a terminal of the alternating-current source which can be an alternating-current generator. However, other alternating-current sources can be used.

As a practical matter and to isolate the measurement system from the lines, it is advantageous to use as the alternating-current source the secondary winding of a low-capacitance transformer from which the potential is tapped.

For the terminal corresponding to the potential of the liquid, it is possible to use the conductive wall of the receptacle in which the depth of the immersion is to be measured or an auxiliary electrode in contact with the liquid. Where the liquid is in electrically conductive relationship with ground, ground can serve as the reference potential.

It has been found to be desirable to employ an alternating-current frequency such that the capacitive reactance of the barrier (insulating) layer which can be formed is negligibly small. This barrier layer functions as a dielectric short-circuit and affects the measured value in direct-current measuring systems. Under the conditions specified above, in accordance with the present invention, using a frequency of about 5000 Hz or thereabove, all perturbations, which might have been expected because of the presence of the barrier layer, are eliminated or excluded.

The apparatus of the present invention can comprise, for measuring the potential difference, an indicating amplifier effective at the applied alternating-current frequency and comprising an alternating-current amplifier, a measurement rectifier and an indicator. Alternatively, a synchronous rectifier can be used whose V-shaped characteristic can be transformed to display the measurement.

It has been found to be advantageous to connect one terminal of the potential-difference measuring means to a tap on a voltage divider bridged across the supply terminals of the alternating-current source. In this case, a potentiometer may have its outer terminals connected to the terminals of the alternating-current source so that its full resistance is connected in parallel with the output thereof, the wiper of the potentiometer serving as the reference terminal of the potential-difference measuring means. The potential-difference measurement in volts for a given height of liquid in the vessel can thus be varied and the potentiometer can be used for zero-setting the indicating scale, for calibration or the like.

According to yet another feature of the invention, the circuit can be provided with means for automatic zero-point compensation of the potential difference by connecting the tap of the potentiometer to a servomotor which adjusts this tap, so that the indicating arrow, point or like member is at the zero position on the scale for a corresponding level of the liquid. Naturally, a bridge circuit can be provided to automatically provide a zero reference.

The measuring electrode which is used, according to the present invention, can have various configurations or constructions and it has been found that the electrode construction can have an effect on the measurement efficiency and precision.

For example, it has been found to be advantageous to immerse the electrode in the liquid and to connect one conductor to the immersed end of the electrode. In this case, the immersed conductor is surrounded by a tube of electrically insulating material which extends along the electrode, the latter in turn being constituted as a resistance wire. Still another highly advantageous configuration can be constituted where the electrode itself is formed as a tube with a higher resistance than the conductors which are connected thereto. The resistance of the electrode, however, is lower than the resistance of the liquid. In this case, the conductor which connects to the end of the electrode below the level of the liquid can be a metal wire or metal rod which is electrically insulated from the tube. The material of the tube and, generally, of the measuring electrode can be graphite or, in the case of thin-wall tubes, a metal resistant to corrosive attack by the medium whose height is to be measured or to chemical or other attack under the conditions prevalent in the vessel in which the measurement is to be taken.

According to another feature of the invention, the electrode is provided with a protective tube formed with throughgoing openings allowing access of the electrode to the conductive liquid. The distance between the protective tube and the electrode is so dimensioned that the protective tube lies outwardly of the zone of the stray or vagabond currents immediately surrounding the electrode. The protective tube can be composed of electrically conductive material and, aside from providing mechanical protection for the electrode, can serve to ground the liquid.

In the case in which the device of the present invention is used with the measurement of the level of low-conductivity liquids, it has been found to be advantageous to provide a compensating condenser or trimmer capacitor between one of the poles or terminals of the alternating-current source and ground. This ensures a sharp zero point setting even where low-conductivity liquids are to be measured. In addition, the use of such a capacitor enables the conductors between the detector and the measuring electrode and reference point to be relatively long, e.g. up to 20 meters. The conductors themselves are preferably designed as double-shield conductors in which the inner shield is at a bootstrap voltage, supplied by the amplifier and corresponding to the amplifier input voltage. The potential and current lines are thereby separate as is customarily the case for remote measurement of resistances.

With liquids of very good conductivity it must be noted that the resistance of the electrode must be small compared to the resistance of the liquid. The system of the present invention can thus be used for liquids whose electrolytic conductivity can range from, for example, that of concentrated acids to that of technically pure water.

It has been found that a sufficient slenderness of the electrode will ensure a satisfactory degree of linearity. However, it is possible to make the electrode less slender or somewhat thick if the end of the electrode immersed in the liquid is provided with an insulating disk. In this case, one duplicates the geometric irregularity at the liquid surface by a countervailing irregularity or boundary condition at the free end of the electrode. This restores the desired degree of symmetry of the stray or vagabond currents.

The system of the present invention may be used to determine the height of the body of liquid which rests upon another liquid or above which another liquid can rest. The interface between the two liquids can be the liquid level of the lower liquid which is to be determined with reference to the bottom of the vessel.

While we prefer to orient the measuring electrode vertically, it should be noted that the electrode can have an inclined orientation in the liquid. It can extend from the top downwardly into the body of liquid or upwardly from the bottom of the vessel.

In a particularly advantageous construction of the device of the invention, the electrode has the configuration of a band. Where the vessel is composed of electrically conductive material and the liquid is to be received therein, this metal band may be spaced a small distance from the wall of the vessel. However, where the vessel is composed of an electrically nonconductive material, the electrode can be a strip which is adhesively bonded, embedded or otherwise applied to an inner wall of the vessel.

It has also been found to be possible to employ a spiral-shaped electrode which allows the total length of the metal in contact with the conductive liquid to be substantially longer than a straight wire. The measuring length of the electrode can thus have a higher electrical resistance so that the measuring current is reduced. A spiral-shaped electrode can consist of a wire wound around a rod of ceramic material, a metal layer or strip printed or bonded to a ceramic carrier body or, in the most general terms, a core or mandrel of nonconductive material about which a multiplicity of conductive turns extend in a helical or other spiral pattern.

In accordance with still another feature of the invention, a surface layer of the electrode is composed of a material which is nonconductive to direct current. For example, an electrically insulating layer may be applied to the electrode which layer is transparent to high-frequency alternating current with frequencies up to one MHz, acting as a dielectric shunt to these frequencies so as not to influence the measurement as long as the capacitive reactance is negligibly small by comparison to the capacitive reactance of the electrically insulating conductor immersed in the conductive liquid.

According to a further feature of the invention, the material of the barrier layer is a thermosetting or thermoplastic synthetic resin, for example, polyfluoroethylene-propylene, a phenol-formaldehyde resin, a furane-type resin, a melamine-formaldehyde resin, an aniline-formaldehyde resin, a polystyrene, a polymonochlorotrifluoroethylene, a polytetrafluoroethylene, a polyvinyl-vinylidene chloride, a polyvinyl chloride, polyethylene, or polyamide. The barrier layer can also consist of synthetic resins made from naturally occurring substances such as isoprenes and the like. Naturally, other electrically insulated synthetic materials or like substances may be employed. For example, ceramic materials ($Al_2O_3$), silicate glazes ($SiO_2$) and enamels may be used for producing the barrier layer.

It has been found to be advantageous to provide a barrier layer whose thickness is 0.01 to 1 mm.

In general, with an increasing thickness of the electrically insulating barrier layer, the resulting increase in the internal resistance of the indicating circuit, as a result of an increase in the input impedance of the indicating amplifier and/or a reduction in the capacity of the leads or conductors, must be taken into consideration.

Of considerable significance with respect to linearity of the level measurement, is the uniformity of the barrier thickness.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
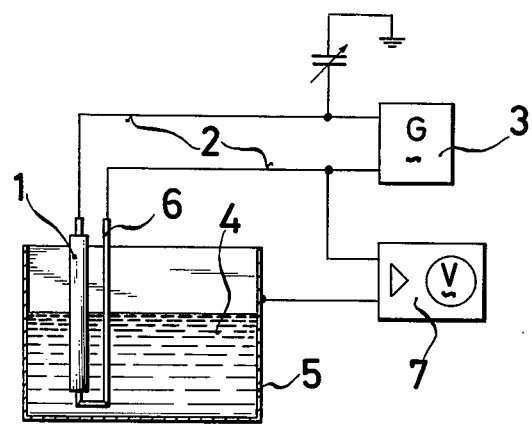
FIG. 1 is a diagrammatic vertical cross-sectional view through an electrode and a device for measuring the potential difference according to the present invention in which the alternating-current source and the measuring means are shown in block-diagram form.

As can be seen from FIG. 1, the device for the measurement of the height of a body of liquid, according to the present invention, comprises an electrode 1 which is at least partly immersed in the body 4 of a conductive liquid. The electrode 1 is connected by leads or conductors (supply leads) 2 with an alternating-current source 3 which is represented as an alternating-current generator although it may be an isolating transformer or the like as long as it is capable of applying a relatively high-frequency alternating current to the electrode 1.

The electrode 1 is, as has been noted, immersed in the liquid 4 which is retained in a vessel 5 of electrically conductive material.

In the region of the liquid 4, the supply leads 2 are passed through a body 6 of electrically insulating material.

To measure the potential difference between the potential at the container wall (and thus the potential of a point P in the middle of the immersed part of the electrode) and the potential outside of the electrode, i.e. at a terminal of the alternating-current generator 3, there is provided a measuring circuit 7. The measuring circuit 7, as diagrammatically represented in the drawing, comprises an alternating-current amplifier, a measuring rectifier and a measuring instrument, e.g. a voltmeter. The indicating voltage-measuring circuit 7 can be any circuit suitable for measuring the voltage at high frequencies.

Figure 2:
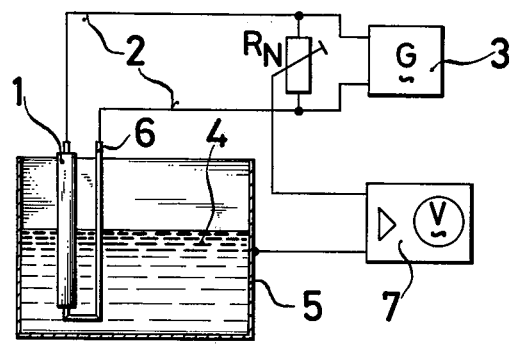
FIG. 2 is a view similar to FIG. 1 illustrating another embodiment of the invention in which a bridge circuit is provided for zero setting.

FIG. 2 shows a modification of the circuit of FIG. 1 wherein, unlike the system of FIG. 1 in which the reference terminal is one of the terminals of the alternating-current source 3, the reference terminal is a tap of a potentiometer $R_N$.

More particularly, in the embodiment of FIG. 2, a potentiometer has its full resistance bridged in parallel across the alternating-current generator 3, e.g. connected across the output terminals of this alternating-current generator. The wiper or movable tap of this potentiometer has a connection to one side of the high-frequency voltage-measuring circuit 7 so that, by adjustment of the wiper of the potentiometer $R_N$, the indicating needle or other voltage-measuring instrument of the circuit 7 can be set to a zero value. The potentiometer of FIG. 2 thus allows zero setting of the measurement. The measuring instruments in the embodiments of FIGS. 1 and 2 can be calibrated, therefore, to read the liquid level directly.

Figure 3:
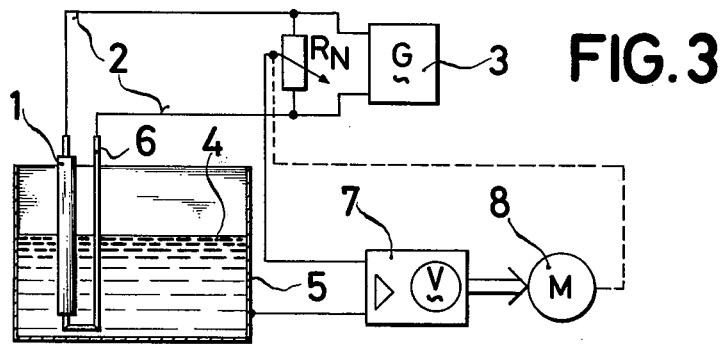
FIG. 3 is a view similar to FIGS. 1 and 2 showing an automatic zero setting system according to the present invention.

In the embodiment of FIG. 3, the measuring instrument 7 need not be provided with an indicating instrument. Instead, the output of the circuit 7 can be applied to a servomotor 8 which can adjust the position of the wiper of the potentiometer $R_N$ so that the potential applied to the servomotor 8 is extinguished. In this case, the position of the potentiometer represents the measurement of the height of the liquid and, of course, the range of displacement of the potentiometer will represent the maximum indicating range of the instrument.

Figure 4:
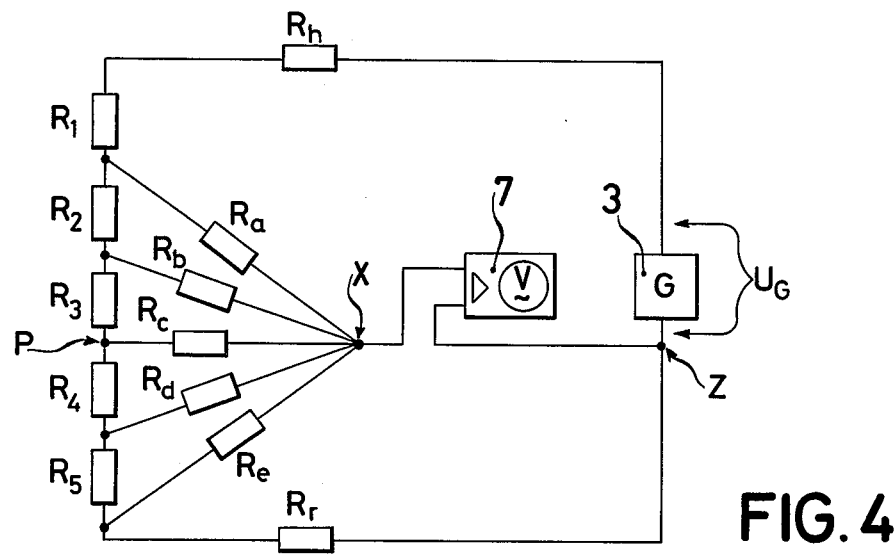
FIG. 4 is a diagram illustrating the principles of operation of the circuits of FIGS. 1–3.

The principles of the operation of the circuits of FIGS. 1–3 will become more readily apparent from the diagram of FIG. 4 which is, in reality, an "equivalent" circuit. More particularly, the equivalent circuit of FIG. 4 represents the circuit of FIG. 1.

In the circuit of FIG. 4, the resistance of the electrode 1 is represented as a series connection of partial resistances $R_1$, $R_2$, $R_3$, $R_4$ and $R_5$. $R_1$ can be the resistance of the portion of the electrode which lies above the liquid level in the vessel while resistors $R_2$ and $R_3$ can represent the resistances of portions of the length of the electrode which lie below the resistor $R_1$, but above the point P which represents the point of the electrode which is sensed by the height-detecting circuit of the present invention. Naturally, the resistors $R_4$ and $R_5$ represent the distributed resistances of the portion of the electrode below the point P.

The contact resistances of the individual portions of the length of the electrode as measured from a point X in the liquid outside the region of the stray or vagabond current, are represented as resistors $R_a$, $R_b$, $R_c$, $R_d$ and $R_e$.

The resistances of the conductors 2 are represented at $R_h$ and $R_r$, respectively.

In the case in which the resistances $R_1$–$R_5$ with respect to the contact resistances are negligibly small, the following relationship prevails:

$$U_{ZP} = U_{ZX} = U_G \frac{R_4 + R_5 + R_r}{R_h + R_1 + R_2 + R_3 + R_4 + R_5 + R_r}$$

wherein:

$U_G$ equals the voltage across the terminals of the alternating-current generator G;

$U_{PX}$ equals the voltage between the points P and X;

$U_{ZX}$ equals the voltage between the points Z and X; and $U_{ZP}$ equals the voltage between the points Z and P.

Since, with a symmetrically distributed stray current, for example in the case of slender cylindrical electrode with a length which is many times greater than the diameter, $R_a$ is practically equal to $R_e$ and $R_b$ is practically equal to $R_d$, $R_c$ is not traversed by a current and hence the voltage $U_{PX}$ equals zero and $U_{PZ}$ equals $U_{ZX}$. The voltage measured by the circuit 7 thus has a linear relationship to the depth of immersion of the electrode and hence the location of the point P therealong.

Figures 5, 6:
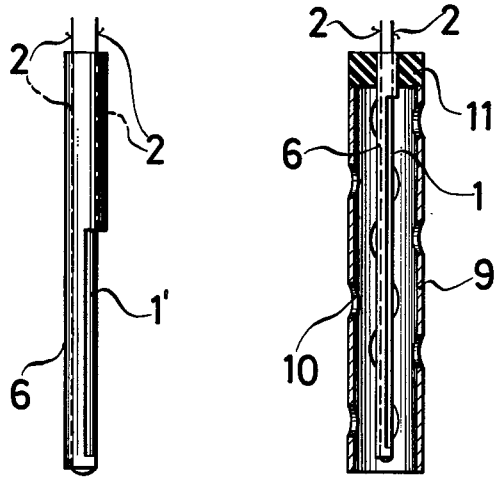
FIG. 5 is an elevational view of an electrode according to the present invention.
FIG. 6 is an axial cross-sectional view through an electrode of the type shown in FIG. 5, but provided with a protective tube in accordance with the principles of this invention.

The electrode 1' shown in FIG. 5 can be constituted as a simple resistance wire that also serves as the supply conductor 2 and, because of this, passes centrally through an insulating tube 6. Only that portion of the wire 1' which is exposed to the liquid serves as the measuring electrode. The remaining portions 2 of the wire are insulated at least in the region of the conductive liquid. FIG. 6 shows that it is possible to enclose the electrode of FIG. 5 in a protective tube 9. In this case, the protective tube 9 is provided with openings or windows 10 which afford access between the conductive portion of the electrode in contact with the liquid and the liquid whose depth is to be measured. The protective tube 9 lies outside the region of the stray current and may be conductive and can be affixed on the electrode body by an insulating block 11.

The block 11 can be bonded to the insulating tube 6 previously mentioned.

Figure 7:
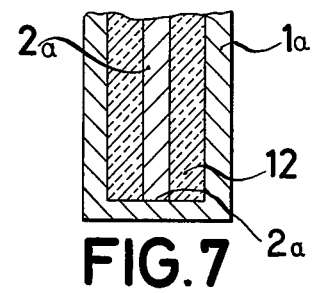
FIGS. 7 and 8 are axial cross-sectional views of other electrode constructions.

FIG. 7 illustrates an embodiment of the present invention in which the electrode $1a$ is formed from a low-conductivity tube of graphite or thin-walled stainless steel, for example, austenitic chromium-nickel steel, while the conductor $2a$, connected to one end of this tube, is constituted as a metal rod. Over the major part of its length, the conductor tube $2a$ is insulated from the tube $1a$ by a body 12 of ceramic insulation. Contact is made at the end of the rod $2a$ as shown at $2a'$ in FIG. 7.

Naturally, at the upper end of the tube $1a$, another conductor can be connected to it (outside the body of liquid as shown in FIGS. 1–3).

Figure 8:
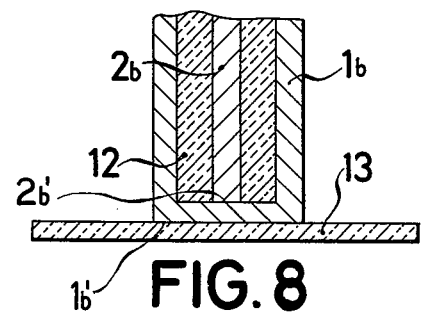

FIG. 8 shows an embodiment of the electrode in which the conductive tube $1b$ is similar or identical to that of FIG. 7 but terminates in an insulating disk 13 which is secured at the lower end $1b'$. Here again, the conductor $2b$ passes co-axially and centrally through the tube $1b$ and is insulated therefrom by a body 12 of ceramic insulation except at the contact point $2b'$.

This embodiment is advantageous when, because of the relatively large diameter of the electrode (when the latter is a tube), the resistance $R_e$ is small relative to the resistance $R_a$. The insulating disk 13 thus restores the symmetry of the stray or vagabond current between the bottom end of the electrode and the point at which the electrode emerges from the liquid. It is possible, when such an insulating disk 13 is used, to employ a relatively thick electrode.

Figure 9:
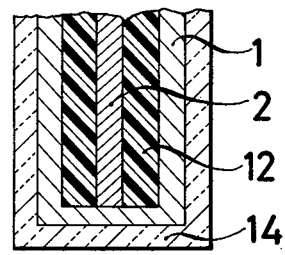
FIG. 9 is a view of an electrode provided with an insulating disc.

FIG. 9 shows an embodiment of the electrode 1 whose construction is similar to that of FIG. 7 except that here the electrode is provided with a thin barrier layer 14 of electrically insulating material as previously described.

Figure 10:
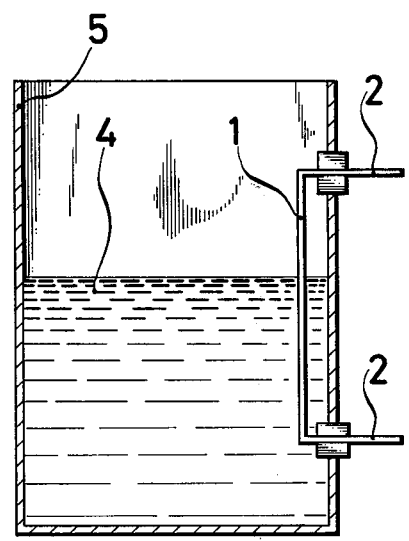
FIG. 10 is a view of an embodiment in which the electrode is formed as a band or strip.

The electrode of FIG. 10 is formed as a strip or band parallel to the wall of the vessel 5 and at a slight distance therefrom. In this case, the wall can consist of electrically conductive material and an insulating layer may be provided between the electrode and this wall.

Figure 11:
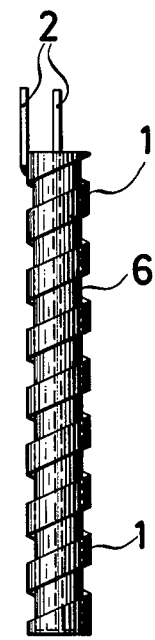
FIG. 11 is a view of an embodiment in which the electrode has a spiral or helical configuration.

The electrode of FIG. 11 is spirally or helically shaped and can be fabricated by coating a metal layer on a ceramic body (i.e. a rod) and then removing the metal layer between the turns.

We claim:

1. A device for measuring the height of a body of electrically conductive liquid, comprising:
   an elongated electrode forming an electrical resistance and partly immersed in said liquid;
   respective conductive leads connected to opposite ends of said electrode and insulated from said liquid;
   an alternating-current cource connected to said leads whereby said source, said leads and said electrode form an electric circuit;
   a conductive member in contact with said liquid and spaced from said electrode by the liquid; and
   measuring means for determining the potential difference between the potential of said liquid at a location outside of a stray current surrounding the electrode and the potential at a point in said circuit outside said electrode whereby said potential difference is a measurement of the height of the body of liquid, the frequency of said source being such that the resistance of said electrode and the capacitive reactance of any barrier layer formed at the interface between said electrode and the liquid is small relative to the contact resistance between the electrode and the liquid, said measuring means having one terminal connected to said member and another terminal connected to said point in said circuit.

2. The device defined in claim 1 wherein said electrode includes a resistance wire and an insulating tube receiving said resistance wire, at least one of said leads extending through said tube.

3. The device defined in claim 1 wherein said electrode consists of a tube of material having resistance higher than that of said leads and lower than that of said liquid, at least one of said leads extending into said tube and being insulated therefrom.

4. The device defined in claim 1, further comprising a protective tube surrounding said electrode and formed with throughgoing openings affording access of the liquid to said electrode, said protective tube lying outside the region of the stray current.

5. The device defined in claim 4 wherein said tube is composed of electrically conductive material.

6. The device defined in claim 1 wherein an end of said electrode extending into said liquid is formed with an insulating disk.

7. The device defined in claim 1 wherein said electrode is formed as a band.

8. The device defined in claim 1 wherein said electrode has the configuration of a helix.

9. The device defined in claim 1 wherein said member is a conductive vessel receiving said liquid and said barrier layer is an electrically nonconductive layer applied to said electrode.

10. The device defined in claim 9 wherein said nonconductive layer is a material selected from the group which consists of thermosetting and thermoplastic synthetic resins, ceramics, glazes and enamels.

11. The device defined in claim 10 wherein said barrier layer has a thickness of 0.01 to 1 mm.

12. A device for measuring the height of a body of electrically conductive liquid, comprising:
    an elongated electrode forming an electrical resistance and partly immersed in said liquid;
    respective conductive leads connected to opposite ends of said electrode and insulated from said liquid;
    an alternating-current source connected to said leads whereby said source, said leads and said electrode form an electric circuit;
    measuring means for determining the potential difference between the potential of said liquid at a location outside of a stray current surrounding the electrode and the potential at a point in said circuit outside said electrode whereby said potential difference is a measurement of the height of the body of liquid, the frequency of said source being such that the resistance of said electrode and the capacitive reactance of any barrier layer formed at the interface between said electrode and the liquid is small relative to the contact resistance between the electrode and the liquid; and
    a resistor connected in parallel to said source across said leads and having a tap intermediate its ends, said measuring means being connected to said tap.

13. The device defined in claim 12, further comprising automatic zero setting means for adjusting the position of said tap, the displacement of said tap representing a measure of the potential difference and the height of said body of liquid.

14. A device for measuring the height of a body of electrically conductive liquid, comprising:
    an elongated electrode forming an electrical resistance and partly immersed in said liquid;
    respective conductive leads connected to opposite ends of said electrode and insulated from said liquid;
    an alternating-current source connected to said leads whereby said source, said leads and said electrode form an electric circuit;
    measuring means for determining the potential difference between the potential of said liquid at a location outside of a stray current surrounding the electrode and the potential at a point in said circuit outside said electrode whereby said potential difference is a measurement of the height of the body of liquid, the frequency of said source being such that the resistance of said electrode and the capacitive reactance of any barrier layer formed at the interface between said electrode and the liquid is small relative to the contact resistance between the electrode and the liquid; and
    a protective tube of electrically conductive material surrounding said electrode and formed with throughgoing openings affording access of the liquid to said electrode, said protective tube lying outside the region of the stray current and being grounded.

15. A device for measuring the height of a body of electrically conductive liquid, comprising:
- an elongated electrode forming an electrical resistance and partly immersed in said liquid;
- respective conductive leads connected to opposite ends of said electrode and insulated from said liquid;
- an alternating-current source connected to said leads whereby said source, said leads and said electrode form an electric circuit;
- measuring means for determining the potential difference between the potential of said liquid at a location outside of a stray current surrounding the electrode and the potential at a point in said circuit outside said electrode whereby said potential difference is a measurement of the height of the body of liquid, the frequency of said source being such that the resistance of said electrode and the capacitive reactance of any barrier layer formed at the interface between said electrode and the liquid is small relative to the contact resistance between the electrode and the liquid; and
- a compensating condenser connected between one terminal of said source and ground.

* * * * *